(12) United States Patent
Beals

(10) Patent No.: US 10,574,664 B2
(45) Date of Patent: Feb. 25, 2020

(54) DEVICE ZONING IN A NETWORK GATEWAY DEVICE

(71) Applicant: Dish Network L.L.C., Englewood, CO (US)

(72) Inventor: William Michael Beals, Englewood, CO (US)

(73) Assignee: DISH NETWORK L.L.C., Englewood, CO (US)

( * ) Notice: Subject to any disclaimer, the term of this patent is extended or adjusted under 35 U.S.C. 154(b) by 175 days.

(21) Appl. No.: 15/669,458

(22) Filed: Aug. 4, 2017

(65) Prior Publication Data

US 2019/0044948 A1 Feb. 7, 2019

(51) Int. Cl.
*H04L 29/06* (2006.01)
*H04L 12/911* (2013.01)

(52) U.S. Cl.
CPC ............ *H04L 63/105* (2013.01); *H04L 47/82* (2013.01); *H04L 63/145* (2013.01); *H04L 65/1069* (2013.01)

(58) Field of Classification Search
CPC ..... H04L 63/10; H04L 63/105; H04L 63/107; H04L 63/145; H04L 47/808; H04L 47/828; H04L 47/82; H04L 65/1069
USPC ........................................................ 709/225
See application file for complete search history.

(56) References Cited

U.S. PATENT DOCUMENTS

| 6,967,941 | B2 | 11/2005 | Roy et al. |
| 7,540,013 | B2 | 5/2009 | Freund et al. |
| 8,200,818 | B2 | 6/2012 | Freund et al. |
| 9,351,193 | B2 | 5/2016 | Raleigh et al. |
| 9,392,462 | B2 | 7/2016 | Raleigh et al. |
| 10,079,812 | B1 * | 9/2018 | Thadishetty ........ H04L 63/0471 |
| 10,177,933 | B2 * | 1/2019 | Burks .................... G08C 17/02 |
| 2006/0251256 | A1 * | 11/2006 | Asokan ................. H04L 63/065 380/270 |
| 2007/0011725 | A1 * | 1/2007 | Sahay ..................... H04L 63/08 726/4 |

(Continued)

FOREIGN PATENT DOCUMENTS

| WO | 2012/075323 A1 | 6/2012 |
| WO | 2015/154133 A1 | 10/2015 |

OTHER PUBLICATIONS

"ASUS Implements Trend Micro Smart Home Network Solution into Wireless Router Products", retrieved from the internet: http://newsroom.trendmicro.com/press-release/alliances/asus-implements-trend-micro-smart-home-network-solution-wireless-router, Sep. 2, 2014, 3 pages.

(Continued)

*Primary Examiner* — Ruolei Zong
(74) *Attorney, Agent, or Firm* — Perkins Coie LLP

(57) ABSTRACT

The disclosure is directed to a network gateway device ("gateway") that provides various network management features, including a device zoning feature in which client computing devices ("client devices") connected to the gateway are assigned to different device zones. The client devices connected to the gateway form a local area network (LAN) of the gateway, and can access an external network, e.g., Internet, using the gateway. Each of the device zones has a specific set of network access privileges. Different device zones can have different network access privileges and can provide device isolation in the LAN at different degrees.

33 Claims, 7 Drawing Sheets

(56) References Cited

U.S. PATENT DOCUMENTS

| | | | |
|---|---|---|---|
| 2011/0219424 A1* | 9/2011 | Panasyuk | G06F 21/606 |
| | | | 726/1 |
| 2014/0324973 A1* | 10/2014 | Goel | H04W 4/70 |
| | | | 709/204 |
| 2015/0382198 A1 | 12/2015 | Kashef et al. | |
| 2016/0006696 A1 | 1/2016 | Donley et al. | |
| 2016/0212099 A1* | 7/2016 | Zou | H04L 63/0263 |
| 2017/0048700 A1* | 2/2017 | Huang | H04W 12/04 |
| 2017/0230832 A1* | 8/2017 | Ophir | H04W 4/70 |
| 2018/0302412 A1* | 10/2018 | Achtermann | H04L 67/125 |

OTHER PUBLICATIONS

Brocade, "Traffic prioritization based on QoS zones" Retrieved from the Internet: http://www.brocade.com/content/html/en/administration-guide/fos-741-adminiguide/GUID-4345C995-B11D-45D0-8C53-6C5021A59E55.html . Publication date via: http://www.brocade.com/content/ht, Nov. 3, 2016, 2 pages.

Fantacci, et al. , "A network architecture solution for efficient IOT WSN backhauling: challenges and opportunities" Retrieved from the Internet: http://www.fitce.be/files/2.pdf Publication date via IEEE: http://ieeexplore.ieee.org/document/6882303/, Aug. 2014, 7 pages.

Luo, et al., "A Multi-stage Attack Mitigation Mechanism for Software-defined Home Networks" retrieved from the Internet via Document Retrieval. IEEE Page: http://ieeexplore.ieee.org/document/7514720/ , May 2016, 8 pages.

* cited by examiner

DEVICE ZONING IN A NETWORK GATEWAY DEVICE

BACKGROUND

A wireless router is a device that performs the functions of a router and also includes the functions of a wireless access point. It is used to provide access to the Internet and/or a private computer network. It can function in a wired local area network (LAN), in a wireless-only LAN (WLAN), or in a mixed wired/wireless network (collectively referred to as "LAN"). With the advent of devices such as smartphones, tablet PCs, gaming consoles, Internet of Things (IoT) devices, the number of devices that can connect to the wireless router has increased exponentially. Not all of the devices that connect to the wireless router are secure. Some devices are vulnerable to security attacks, and when a device is attacked, it can attack other devices in the LAN, thereby compromising other devices as well. Some wireless routers minimize such attacks on other devices using a feature known as device isolation, which prevents a computer that is connected to the wireless router from accessing other computers and resources in the LAN. However, prior device isolation techniques are not efficient. In some embodiments, the device isolation has to be enabled or disabled for each device that connects to the wireless router, which is inconvenient. In another example, the prior device isolation does not provide different degrees of isolation.

DETAILED DESCRIPTION

Figure 1A:
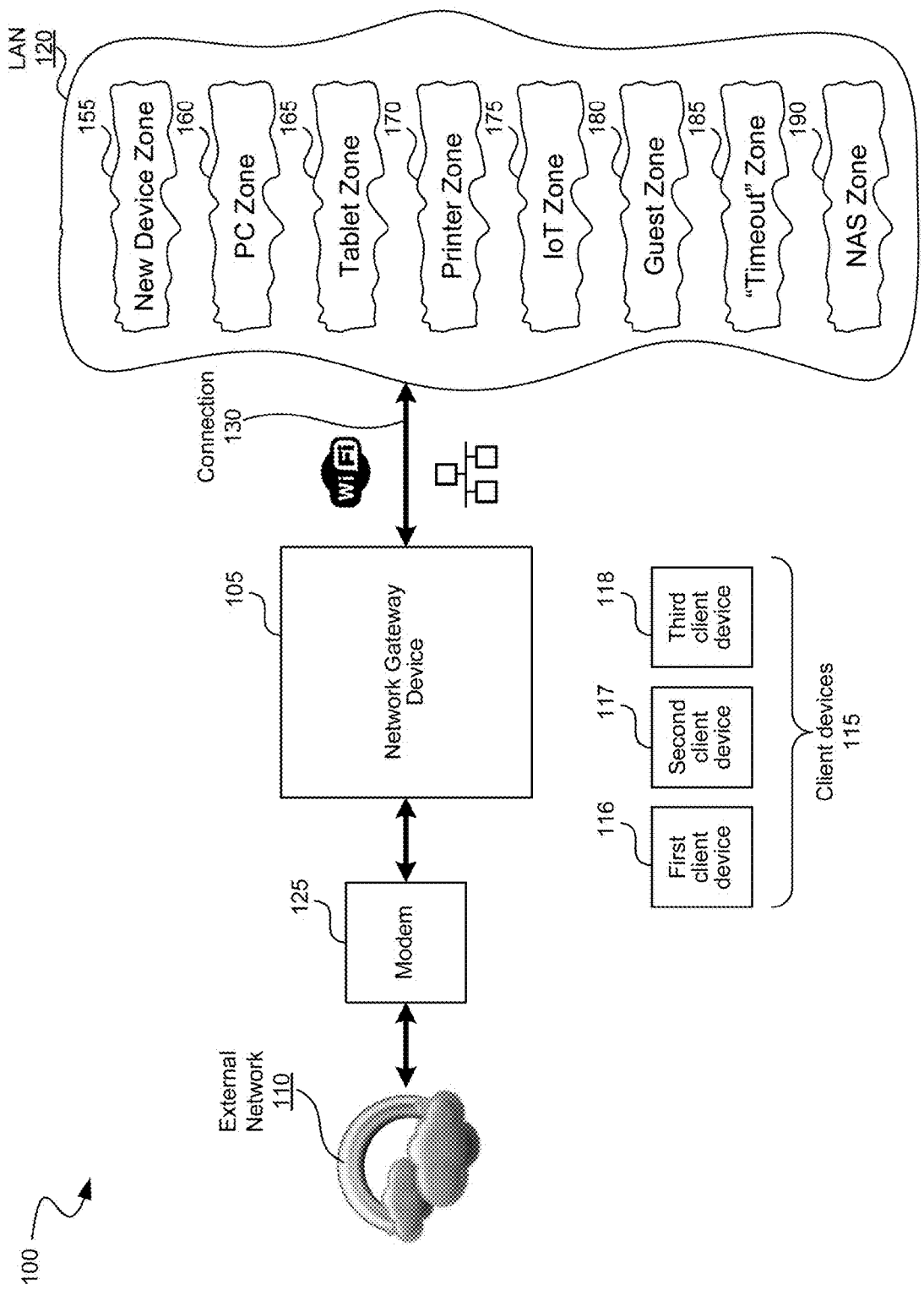
FIG. 1A is a block diagram of an environment in which the disclosed embodiments may be implemented.

Embodiments are directed to a network gateway device ("gateway") that provides various network management features, including a device zoning feature in which client computing devices ("client devices") connected to the gateway are assigned to different device zones. The client devices connected to the gateway form a local area network (LAN) of the gateway, and can access an external network, e.g., Internet, using the gateway. Each of the device zones has a specific set of network access privileges. Different device zones can have different network access privileges and can provide isolation from other resources in the LAN to different degrees. For example, a "personal computer (PC) zone" can provide a client device assigned to the PC zone a full access to the external network and full access to at least some of the other resources in the LAN. In another example, a "printer zone" can provide a client device assigned to the printer zone full access to the external network but restrict the client device from accessing other resources in the LAN. In still another example, an "Internet of Things (IoT) zone" can provide a client device assigned to the IoT zone full access to the external network, full access to resources that are within the IoT zone, and limited access to resources in another zone. In yet another example, a "timeout zone" can provide a client device limited access to the external network, e.g., limited bandwidth and/or access to limited websites, and no access to other resources in the LAN.

The gateway can assign a client device to one of the device zones based on one or more parameters of the client device. A parameter of the client device can be a hardware related parameter, e.g., a type of the client device, medium access control (MAC) address, a network-related parameter, e.g., Internet protocol (IP) address, and/or a software related parameter, e.g., a functionality of the client device. For example, a client device of type such as a personal computer can be assigned to the PC zone. In another example, a client device that exhibits a functionality of a failed malware check is assigned to the timeout zone. In some embodiments, the gateway can assign the client device to a first device zone initially, and can reassign to another device zone at a later time. For example, when a client device connects to the gateway for a first time, the gateway can initially assign the client device to a "new device zone," which can provide limited access to the external network and no access to other resources in the LAN, and then after obtaining information that client device is a trusted PC, can reassign the client device to the PC zone.

The gateway also provides various other network management features. For example, the gateway provides a backup service, which can backup data from a client device in the LAN to a data storage system in the LAN, e.g., a network attached storage (NAS) system, and/or to a data storage server in the external network, e.g., a cloud storage service. In another example, the gateway provides a malware detection and mitigation service, which can determine if the client device is compromised, e.g., affected by malware, and optionally, mitigate the detected malware. In another example, the gateway provides a parental control service, which can restrict the client device from accessing certain content such as inappropriate content, which can constrain the usage of client devices such as placing time limits on usage or forbidding certain types of usage, and which can track location and activity when using the client devices. In another example, the gateway provides a virtual private network (VPN) service, e.g., Internet protocol (IP) address resolution, for the client devices. In another example, the gateway provides a television-based dashboard, which can be used to view and/or edit configuration settings of the gateway. In another example, the gateway provides a reporting service, which can generate reports for a variety of information, e.g., devices connected to the gateway, new device connections, network bandwidth usage, printer and/or NAS low resource warnings, and power loss/restoration notifications.

Typically, a gateway has one or two zones, e.g., a regular zone to which most of the client devices are assigned and a guest zone to which client devices that need temporary access to the external network are assigned. In some embodiments, by having an expanded zone, e.g., more than two device zones, and providing the ability to customize network access privileges for the various device zones, the gateway can provide better network security to the client devices in the LAN without compromising the network connectivity.

The gateway can be managed by a user associated with the gateway, e.g., a network owner, or by a third party, e.g., remotely from the external network. In some embodiments, the third party can be an enterprise that provides network management services. In some embodiments, managing the gateway includes one or more of defining one or more device zones, customizing the attributes of the device zones, assigning the client devices to a specific device zone, moving the client devices between device zones, LAN related management, etc. By having the gateway managed by a third party, the network owner can obtain better network security, prompt resolution of network related problems, and/or efficient management of the network management features.

Turning now to the figures, FIG. 1A is a block diagram of an environment 100 in which the disclosed embodiments may be implemented. The environment 100 includes a network gateway device 105 that provides client computing devices 115 access to an external network 110, such as Internet. The gateway 105 can be a wireless router, a wireless access point, a modem cum router, a set-top box, or any computing device that can provide access to the external network 110. In some embodiments, the gateway 105 can connect to a modem 125 that connects to an Internet service provider to provide access to Internet. In some embodiments, the gateway 105 is a set-top box, which is an electronic equipment that can acquire, process and distribute one or more signals transmitted by broadcast, cable, telephone, or satellite distributors in addition to providing access to the external network 110. The external network 110 can be Internet, wide area network (WAN), etc. The client device can be any computing device that can access the external network 110. For example, the client devices 115 can be a desktop, a laptop, a tablet PC, a smartphone, a wearable computing device, an IoT device, a set-top box, a wireless router, a media streaming device, or a NAS device.

The client devices 115 can connect to the gateway via a wireless or a wired network connection 130. For example, a first client device 116 can connect to the gateway 105 wirelessly and a second client device 117 can connect to the gateway 105 via a wired network connection, e.g., Ethernet cable. The client devices 115 connected to the gateway 105 form a LAN 120 of the gateway 105. In some embodiments, the gateway 105 can be a wireless router in a home of the network owner and the client devices 115 can include a desktop, a laptop, a smartphone, a tablet PC, an IoT device or a NAS device associated with the network owner.

Figure 1B:
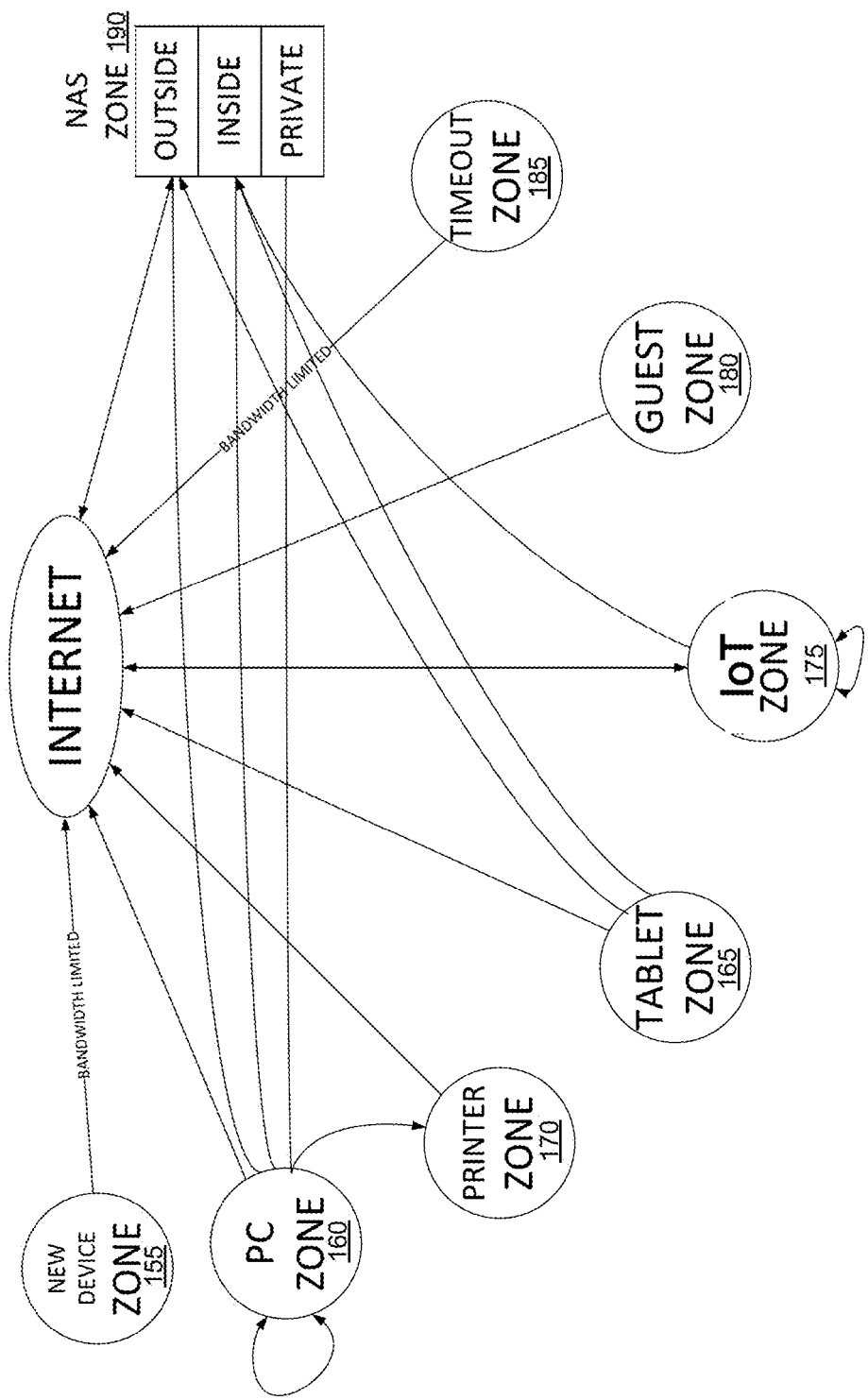
FIG. 1B is a block diagram illustrating network access privileges provided to the computing devices assigned to different device zones of the gateway in which the disclosed embodiments may be implemented.

The gateway 105 can generate various device zones, each of which provides a specific set of network access privileges, and can assign a client device to one of the device zones based on one or parameters associated with the client device. In some embodiments, the gateway 105 can generate a new device zone 155, a trusted device zone 160, such as a PC zone, a tablet zone 165, a printer zone 170, an IoT zone 175, a guest zone 180, a timeout zone 185 and a NAS zone 190. Different device zones can have different network access privileges and can provide isolation from other resources in the LAN 120 at different degrees. FIG. 1B is a block diagram illustrating network access privileges provided to the computing devices assigned to different device zones of the gateway 105, consistent with various embodiments. The gateway 105 can assign a client device to one of the device zones automatically, e.g., based on the one or more parameters associated with the client device, based on an input from the network owner, and/or based on an input from a remote user, such as a third party service provider.

In some embodiments, the gateway 105 assigns a new client device, e.g., a client device that has not connected to the gateway 105 before, or a client device whose information is not available in a known-client devices list, to the new device zone 155. The new device zone 155 provides limited access to the external network 110, e.g., limited bandwidth and/or websites, and restricts the client device from accessing other resources in the LAN 120. In some embodiments, after obtaining additional information about the client device, the gateway 105 can reassign the client device to one of the other device zones.

In some embodiments, the PC zone 160 provides a full access, e.g., unrestricted access, to the external network 110. The PC zone 160 can also provide access to other resources in the LAN 120, e.g., other client devices within the PC zone 160 and to client devices in one or more of the other device zones, such as a NAS device in the NAS zone 190 and a printer in the printer zone 170. The gateway 105 typically assigns a client device to the PC zone 160 if the client device is identified as a "trusted device." A trusted device can be any client device that is designated as such by the network owner. Typically, a trusted device is a device that does not pose a security risk to other resources in the LAN 120, and is provided unrestricted access to the external network 110 and some resources in the LAN 120 as compared to an untrusted client device. For example, a trusted device, such as a client device in the PC zone 160, is provided access to all three modes of access of the NAS device in the NAS zone 190 while an untrusted device is not. In addition, on a trusted device, a user may not have to go through as many authentication processes as in an untrusted device to access certain data in the external network 110 or the LAN 120.

In some embodiments, the gateway 105 assigns a client device such as a printer device to the printer zone 170. The printer zone 170 can provide the client device full access to the external network 110 and restrict the client device from accessing other resources in the LAN 120. In some embodiments, client devices from other device zones, such as the PC zone 160, are provided access to the client devices in the printer zone 170. In some embodiments, for a communication between a pair of devices, e.g., a pair of client devices or a client device and the gateway 105, one of the given pair of devices can initiate the communication while the other device may not. For example, for a printer, while a PC can initiate communication with the printer and the printer will respond, the printer is prevented by the gateway 105 from initiating communication with the PC. Similarly, the printer can initiate communication with the gateway 105 and not vice versa. However, with an IoT device, either the gateway 105 or the IoT device can initiate the communication with each other.

In some embodiments, the gateway 105 assigns a mobile client device, such as a smartphone or a tablet PC, to the tablet zone 165. The tablet zone 165, like the PC zone 160, can provide full access to the external network 110. However, unlike the PC zone 160, the tablet zone 165 can provide limited access to other resources in the LAN 120. For example, the tablet zone 165 may not permit a client device in the tablet zone 165 to access other client devices in the tablet zone 165. In another example, the tablet zone 165 may permit the client device to access only some of all three modes of access, e.g., "inside access" and "outside access" of the NAS device in the NAS zone 190 but not all, e.g., "private access."

In some embodiments, the gateway 105 assigns an IoT device such as a media-streaming device to an IoT zone 175. An IoT device is any nonstandard computing device that connects to a network, e.g., wirelessly, and has the ability to transmit and/or receive data. IoT devices include thermostats, light bulbs, door locks, fridges, cars, smart televisions, among an almost infinite list of possibilities. However, these IoT devices pose privacy and security threats. In some embodiments, the IoT devices are targets for cyberattacks. The IoT zone 175 can provide a client device assigned to the IoT zone 175 full access to the external network 110 but limited access to other resources in the LAN 120. For example, the IoT zone 175 can restrict the client device from accessing resources in the LAN 120 other than resources that are within the IoT zone 175. In another example, the IoT zone 175 provides limited access to the NAS device, e.g., "inside access," while restricting access to the "outside access" and the "private access" of the NAS device.

In some embodiments, the gateway 105 assigns a client device such as a data storage device to the NAS zone 190. The NAS zone 190 provides client devices assigned to the NAS zone 190 full access to the external network 110 while restricting access to other resources in the LAN 120. However, as described above, client devices from some of the other zones can access the NAS zone 190. The data storage device can be a network attached storage device or an external storage device that provides data storage services to the client devices 115 in the LAN 120. In some embodiments, a NAS device is a type of dedicated file storage device that provides client devices in the LAN 120 with file-based shared storage through wired or wireless network connection. A NAS device can reside on the LAN 120 as an independent network node and can have its own IP address. In the home, NAS devices are often used for storing and serving multimedia files and for automated backups. A NAS device can provide centralized storage for smart TVs, security systems and other IoT devices. In the enterprise, a NAS array can be used as a backup target for archiving and disaster recovery. In some embodiments, the NAS device includes three modes of access—"outside," "inside" and "private." In the external or outside access mode, the NAS device can be accessible by a user from outside of the LAN 120 in addition to being accessible by one or more client devices in the LAN 120. The external access mode may or may not require the user to provide user credentials to access the NAS device. The read/write/modify permissions to the NAS device can be configured by the network owner. In the internal or inside access mode, the NAS device is accessible from within the LAN 120, e.g., for one or more authorized devices within the LAN 120. However, in the internal access mode, the NAS device is not accessible by users or devices from outside of the LAN 120. In a private access mode, access to the NAS device is on a per device or per zone basis. For example, if a specific client device in a specific zone stores data on to the NAS device, only that specific client device or client devices in that specific zone can access that data. In some embodiments, the private access mode can be used to storing personal data, e.g., data which is not to be shared across the entire LAN 120. In some embodiments, different portions of the NAS device can be in different access modes, e.g., different portions of the data are accessible through different access modes. For example, a first portion of the data can be accessible through external access mode (and at least in some cases, through internal access mode), a second portion of the data may be accessible through internal access mode but not external access mode, and a third portion of the data may be accessible through private access mode but not external and internal access modes.

The NAS device can also backup data from one or more of the client devices in the LAN 120, including the NAS device, to a data storage service in the external network 110, e.g., a cloud storage service. In some embodiments, the gateway 105 can have access to all data on the NAS device regardless of the access mode with which the data is associated, and can ensure that all of the data is backed up as needed.

In some embodiments, the gateway 105 assigns a client device that needs temporary access to the external network 110 to the guest zone 180. The client devices in the guest zone 180 can have full access to the external network 110 but are typically restricted from accessing other client devices in the LAN 120 either within the guest zone 180 or outside of the guest zone 180. The client devices can connect to the gateway 105 wirelessly using a service set identifier (SSID) of the wireless network of the gateway 105. Typically, a guest network of the gateway 105 has a different SSID from that of non-guest wireless networks of the gateway 105. When a client device connects to the gateway 105 using the SSID of the guest network, the client device is assigned to the guest zone 180. The guest zone 180 is typically for "guests," that is, client devices that require access to the external network 110 temporarily. In some embodiments, by restricting the client devices in the guest zone 180 from accessing other client devices, e.g., using printers or sharing data with other client devices, the LAN 120 is more secure. The client device typically has to provide authentication information, e.g., a password, to access the guest network. Further, in some embodiments, the client devices in the guest zone 180 can be disconnected after a specified period, e.g., minutes, hours, days, and the client device has to authenticate itself if it has to connect to the guest network again. In some embodiments, a client device can be disconnected from the gateway 105 after a specified period of time with no connection to the gateway 105. For example, when a guest user departs the guest network coverage area, the client device associated with the guest user is automatically disconnected after a specified period. When the client devices are disconnected, their information can be removed from the known-devices list of the gateway 105.

In some embodiments, the gateway 105 moves a client device from one of the device zones to the timeout zone 185 in an event the client device fails an integrity check or a security check. In the timeout zone 185, the client devices are isolated from other client devices in the LAN 120 as the client devices is restricted from accessing other client devices in the LAN 120 either within the timeout zone 185 or outside of the timeout zone 185. Further, the client devices in the timeout zone 185 are provided limited access to the external network 110, e.g., limited bandwidth and/or limited websites.

In some embodiments, apart from providing an expanded device zone that provides various degrees of isolation between client devices in the LAN, the gateway 105 provides various features such as, backup services, VPN services, malware detection and mitigation services, and detailed network activity reporting.

Figure 2:
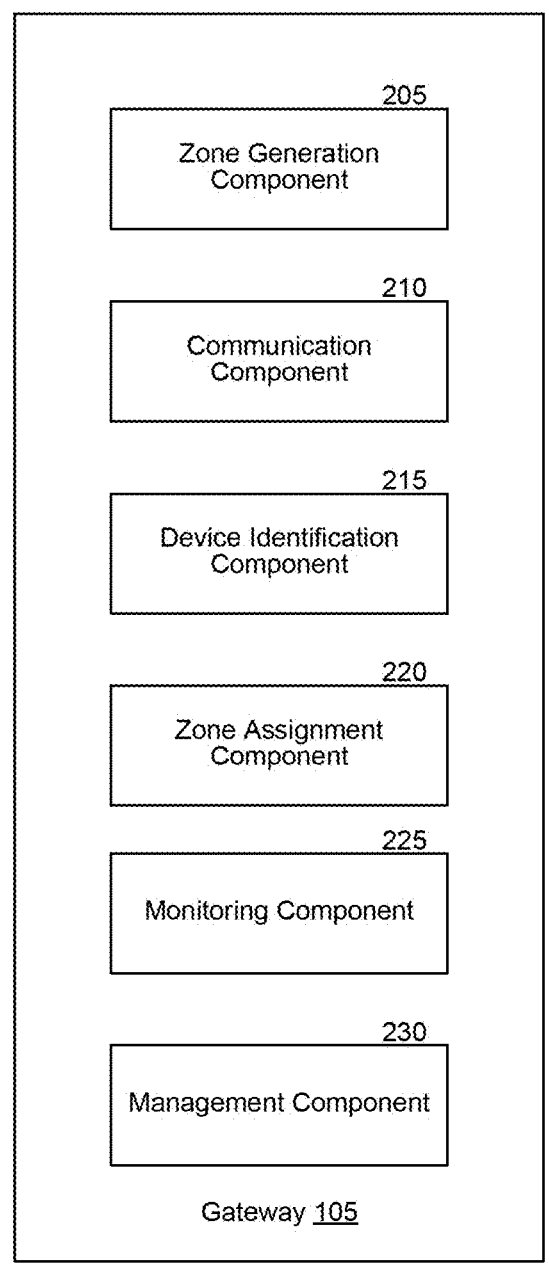
FIG. 2 is a block diagram of a gateway of FIG. 1, consistent with various embodiments.

FIG. 2 is a block diagram of the gateway of FIG. 1, consistent with various embodiments. The gateway 105 includes various components that are configured to perform various functions, e.g., the above-described functions, of the gateway 105. The gateway 105 includes a zone generation component 205, a communication component 210, a device identification component 215, a zone assignment component 220, a monitoring component 225 and a management component 230.

The zone generation component 205 generates multiple device zones, e.g., the new device zone 155, the trusted device zone 160, the tablet zone 165, the printer zone 170, the IoT zone 175, the guest zone 180, the timeout zone 185 and the NAS zone 190. Different device zones have different network access privileges and provide different degrees of isolation between the client devices connected to the gateway 105. The number of device zones and/or attributes of a device zone can be customized. In some embodiments, the zone generation component 205 can be configured to generate more than or less than the number of device zones described above. For example, the zone generation component 205 may not generate the tablet zone 165 and instead assign the client devices that were to be assigned to the tablet zone 165 to another device zone, e.g., PC zone 160. In another example, the zone generation component 205 may generate an additional device zone such as a gaming zone and assign client devices such as gaming consoles to the gaming zone. In some embodiments, the zone generation component 205 can be configured to customize the attributes of a device zone. For example, the zone generation component 205 can be configured to customize the tablet zone 165 to permit the client devices to access all three accesses of the NAS device.

The communication component 210 is configured to facilitate various communications between the client devices, between a client device and the gateway 105, and between a client device and the external network 110. For example, the communication component 210 can receive connection requests from the client devices 115 for connecting to the gateway 105. In another example, the communication component facilitates data exchange between a client device and the external network 110. In another example, the communication component 210 facilitates data exchange between two or more client devices. In another example, the communication component 210 can broadcast SSID of the wireless network of the gateway 105.

The device identification component 215 is configured to identify a client device that is connected to or requests to connect to the gateway 105. In some embodiments, the device identification component 215 identifies one or more parameters associated with the client device based on information included in a data packet received from the client device. The parameters can include device identification information such as a MAC address of the client device, an IP address, a type of the client device, e.g., a desktop, a laptop, a smartphone, a tablet, an IoT device, an application in the client device, communication protocols used by the client device, etc. The client device can provide one or more of the above parameters in a header of the data packet, e.g., in a connection request data packet sent to the gateway 105. In some embodiments, the network owner can also provide some device identification information to the gateway 105, e.g., whether the client device is a trusted device. The network owner can provide device information using a graphical user interface (GUI) provided by the gateway 105. The GUI can also be used by the network owner to configure other network management features of the gateway 105.

In some embodiments, the device identification component 215 can store the device information of the client devices connected to the gateway 105, e.g., in a known-devices list. The device information can include device identification information, e.g., the one or more parameters associated with a client device described above, and the device zone to which the client device is assigned in an event the client device is already assigned to a device zone. The known-devices list can include device information regarding client devices that are currently connected to the gateway 105 and that were previously connected. In some embodiments, the device identification component 215 can update the known-devices list in response to a trigger. The trigger can be a new client device connecting to the gateway 105, an existing client device being removed from the list, expiry of a specified period, etc. For example, the device identification component 215 can update the known-devices list to add a new client device when a new client device connects to the gateway 105. In another example, the device identification component 215 can update the list when an existing client device is removed from the list, e.g., by the network owner. In still another example, the device identification component 215 can update the list to remove some client devices from the list that have not connected to the gateway 105 for a certain period. In yet another example, the device identification component 215 can update the list to remove client devices connected to the guest zone 180 after a certain period, e.g., hours, days or weeks.

The zone assignment component 220 can assign a client device to one of the device zones based on one or more parameters associated with the client device. The zone assignment component 220 can obtain the parameters from the device identification component 215.

In some embodiments, the zone assignment component 220 assigns a new client device to the new device zone 155. As described above at least with reference to FIGS. 1A and 1B, a new client device can be a client device that is connecting to the gateway 105 for a first time, or a client device whose device information, e.g., MAC address, is not available in the known-devices list. After obtaining additional information about the client device, the zone assignment component 220 can reassign the client device to one of the other device zones. For example, the zone assignment component can initially assign a new client device such as a first client device 116 to the new device zone 155, and can reassign to the tablet zone 165 subsequently, e.g., after obtaining additional information indicating that the first client device 116 is a tablet. In another example, the zone assignment component 220 can generate a notification to the network owner indicating that the first client device 116 is assigned to new device zone 155. The notification can also prompt the network owner to input a device zone to which the first client device 116 is to be assigned.

In some embodiments, the zone assignment component 220 assigns a client device to the PC zone 160 in an event the parameter associated with the client device indicates that the client device is a PC and/or a trusted device.

In some embodiments, the zone assignment component 220 assigns a client device to the tablet zone 165 in an event the parameter associated with the client device indicates that the client device is a tablet.

In some embodiments, the zone assignment component 220 assigns a client device to the printer zone 170 in an event the parameter associated with the client device indicates that the client device is a printer.

In some embodiments, the zone assignment component 220 assigns a client device to the IoT zone 175 in an event the parameter associated with the client device indicates that the client device is an IoT device. In some embodiments, the device identification component 215 can infer that a particular device is an IoT device by matching hardware configuration and/or software configuration of the client device with a predefined list of IoT devices. For example, if a processor type, make, or model of the client device, and/or communication protocols used by the client device matches with one of multiple device configurations in the predefined list of IoT devices, the device identification component 215 can infer that the client device is an IoT device. Further, the network owner can also indicate, e.g., using the GUI, that the client device is an IoT device and assign the client device to the IoT zone 175.

In some embodiments, the zone assignment component 220 assigns a client device to the NAS zone 190 in an event the parameter associated with the client device indicates that the client device is a data storage device.

In some embodiments, the zone assignment component 220 assigns a client device to the guest zone 180 in an event the gateway 105 receives an indication that the client device requests temporary connection. For example, if the client device requests the connection to the gateway 105 via a SSID of the guest network of the gateway 105, then the device identification component 215 indicates that the connection request is a request for temporary connection. The zone assignment component 220 can then assign the client device to the guest zone 180. In some embodiments, the client device needs to provide authentication information, e.g., a network key, a passcode, or a password, for connecting to the guest zone 180. In some embodiments, the zone assignment component 220 assigns a client device to the guest zone 180 by first assigning the client device to the new device zone 155, e.g., if the client device has not connected to the gateway 105 before or if the device is not in the known-devices list, and sends a connection request to the network owner who can then assign the client device to the guest zone 155.

Referring back to the gateway 105, the monitoring component 225 monitors a status of the various client devices connected to the gateway 105. For example, the monitoring component 225 monitors a health of the client device such as whether the client device is infected by a malware, has failed an integrity check, performing a function that is not expected of the client device, or otherwise compromised. In another example, the monitoring component 225 monitors the network bandwidth consumed by the client devices 115. The monitoring component 225 can report the status to one or more components of the gateway 105. For example, in an event the client device is infected, e.g., has failed a security check, an integrity check or otherwise compromised, the monitoring component 225 reports it to the zone assignment component 220. The zone assignment component 220 moves the infected client device to the timeout zone 185, where the client device is isolated from other client devices in the LAN 120.

In some embodiments, the management component 230 is configured to perform various other network management features of the gateway 105. For example, the management component 230 provides a backup service, which can backup data from a client device to the NAS device in the NAS zone 190 and/or to a data storage server in the external network 110, e.g., a cloud storage service. In another example, the management component 230 provides a malware detection and mitigation service, which can scan a client device in the LAN 120 for malware and optionally, mitigate the detected malware. The management component 230 can also perform various other security related functions. In another example, the management component 230 provides a parental control service, which can (a) keep a client device from accessing certain content such as inappropriate content, (b) constrain the usage of client devices such as placing time limits on usage or forbidding certain types of usage, and (c) track location and activity when using the client devices. In another example, the management component 230 provides a VPN service, e.g., IP address resolution, for the client devices. In another example, the management component 230 provides a television-based dashboard, which can be used to view and/or edit network management features of the gateway 105. In another example, the management component 230 provides a reporting service, which can generate reports for a variety of information, e.g., devices connected to the gateway, new device connections, network bandwidth usage, printer and/ or NAS low resource warnings, and power loss/restoration notifications.

In some embodiments, the network management features, such as the generation and configuration of device zones and assignment of the client devices to the device zones, can be customized by the network owner. The management component 230 provides a GUI using which the network owner can view, and/or modify the network management features of the gateway 105. In some embodiments, the network management features are managed by a third party service provider, e.g., an enterprise or a person that specializes in managing gateways. The third party service provider can provide a "gateway management app" and/or "gateway management firmware" which the network owner can install in the gateway 105. The gateway management app can include the instructions for configuring the network management features to manage the gateway 105. In some embodiments, an operator from the third party service provider can remotely login to the gateway 105 and the access the gateway management app to manage the gateway 105. Note that even if the gateway 105 is managed by the third party service provider, the network owner can still override the configurations performed by the third party service provider.

Figure 3:
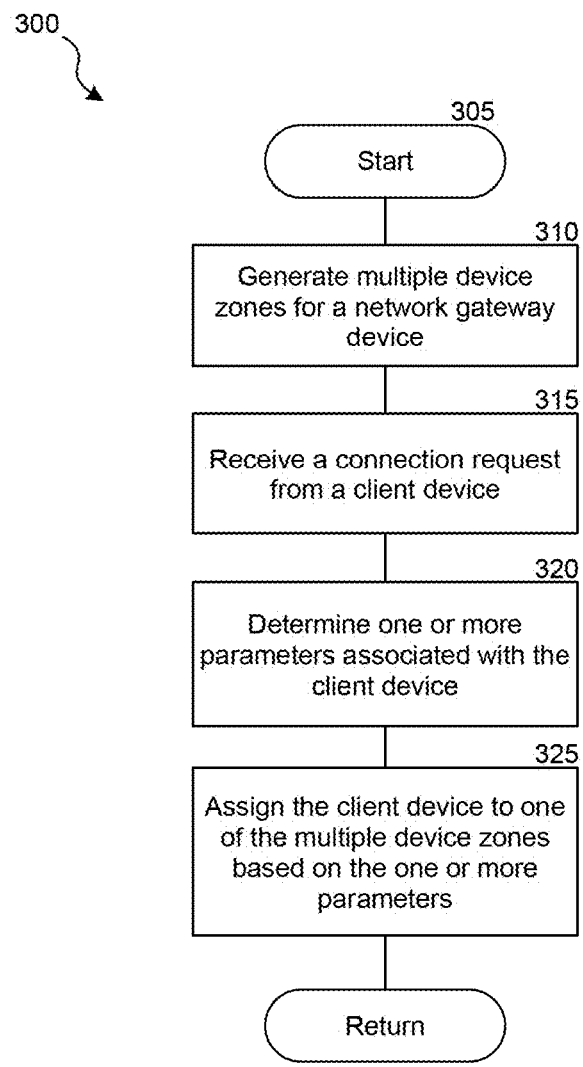
FIG. 3 is a flow diagram of a process for assigning a client device to a device zone of the gateway of FIG. 1, consistent with various embodiments.

FIG. 3 is a flow diagram of a process 300 for assigning a client device to a device zone of a gateway of FIG. 1, consistent with various embodiments. In some embodiments, the process 300 may be implemented in the environment 100 of FIG. 1. The process 300 begins at block 305, and at block 310, the zone generation component 205 generates multiple device zones for the gateway 105. In some embodiments, the device zones include the new device zone 155, the trusted device zone 160, the tablet zone 165, the printer zone 170, the IoT zone 175, the guest zone 180, the timeout zone 185 and the NAS zone 190. Different device zones have different network access privileges and provide different degrees of isolation between the client devices connected to the gateway 105.

At block 315, the communication component 210 receives a connection request from a client device, e.g., a third client device 118, for connecting to the gateway 105. The connection request can be received wirelessly or by wired means, e.g., Ethernet cable. The LAN 120 of the gateway 105 can include a wired LAN portion, which includes client devices connected to the gateway 105 via wired means, and a wireless LAN (WLAN) that includes client devices connected to the gateway 105 wirelessly. In some embodiments, a subset of the device zones (e.g., two or more) has the same SSID, and at least one of the device zones, e.g., the guest zone 180, has a different SSID from that of the subset. The third client device 118 has to select one of the SSIDs to connect to the gateway 105 wirelessly. In some embodiments, all the device zones have the same SSID. The guest zone 180 may have the same SSID as that of the other device zones and not a different SSID. In some embodiments, admission of a client device to the guest zone 180 can be through the new device zone 155, e.g., as described above, and therefore, the guest zone 180 may not need a different SSID.

At block 320, the device identification component 215 identifies and/or derives one or more parameters associated with the third client device 118. The parameters can include device identification information such as a MAC address of the client device, an IP address, a type of the client device, e.g., a desktop, a laptop, a smartphone, a tablet, an IoT device, an application in the client device, communication protocols used by the client device, etc. In some embodiments, the device identification component 215 can extract the one or more parameters from a connection request data packet received from the third client device 118. In some embodiments, the device identification component 215 can retrieve the one or more parameters from a known-devices list based on the information included in the connection request data packet. In some embodiments, the device identification component 215 can receive the one or more parameters from the network owner.

At block 325, the zone assignment component 220 can assign the third client device 118 to one of the device zones based on the one or more parameters of the third client device 118, e.g., as described at least with reference to FIG. 2.

Figure 4:
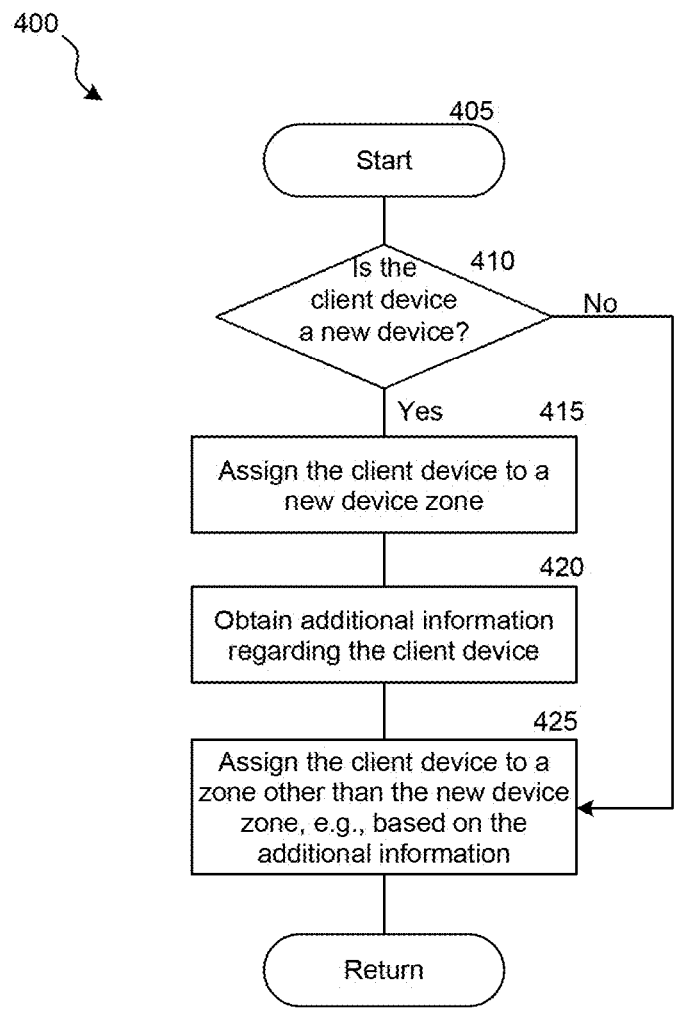
FIG. 4 is a flow diagram of a process for assigning a client device to a new device zone of the gateway of FIG. 1, consistent with various embodiments.

FIG. 4 is a flow diagram of a process 400 for assigning a client device to a new device zone of the gateway of FIG. 1, consistent with various embodiments. In some embodiments, the process 400 may be implemented in the environment 100 of FIG. 1, and can be executed as part of block 325 of process 300 of FIG. 3. The process 400 begins at block 405, and at determination block 410, the device identification component 215 determines whether the third client device 118 is a known client device. In some embodiments, the device identification component 215 determines that the third client device 118 is a known device if the third client device 118 has connected to the gateway 105 previously (e.g., prior to the determination) and the device information of the third client device 118 is stored in the known-devices list of the gateway 105. If the device information of the third client device 118 is not stored in the known-devices list, the device identification component 215 determines the third client device 118 as a new or an unknown client device. If the device identification component 215 determines the third client device 118 as a new device, at block 415, the zone assignment component 220 assigns the third client device 118 to the new device zone 155. While in the new device zone 155, the third client device 118 has a limited access to the external network 110, e.g., limited bandwidth, and restricted from accessing other resources in the LAN 120. In some embodiments, the third client device 118 remains assigned to new device zone 155 until the network owner or the gateway reassigns the third client device 118 to another device zone. In some embodiments, the communication component 210 generates a notification indicating to the network owner that the third client device 118 is assigned to the new device zone 155. The notification can even prompt the network owner to reassign the third client device 118 to another device zone. The notification can be sent to the network owner as an email, a text to a user-preferred device, an in-app notification on the user-preferred device, or as a notification within the GUI of the gateway 105.

At block 420, the device identification component 215 obtains or derives additional information regarding the third client device 118. For example, the device identification component 215 can extract one or more parameters associated with the third client device 118 from the connection request data packet. The parameters can include device identification information such as a MAC address of the client device, an IP address, a type of the client device, e.g., a desktop, a laptop, a smartphone, a tablet, an IoT device, an application in the client device, communication protocols used by the client device, etc.

At block 425, the zone assignment component 220 assigns the third client device 118 to one of the device zones based on the additional information. For example, the zone assignment component 220 assigns the third client device 118 to the PC zone 160 in an event the additional information indicates that the third client device 118 is a PC and/or a trusted device. In another example, the zone assignment component 220 assigns the third client device 118 to the tablet zone 165 in an event the additional information indicates that the third client device 118 is a tablet. In still another example, the zone assignment component 220 can assign the third client device 118 to the printer zone 170 if the additional information indicates that the third client device 118 is a printer. In yet another example, the zone assignment component 220 assigns the third client device 118 to the IoT zone 175 in an event the additional information indicates that the third client device 118 is an IoT device.

In some embodiments, the additional information can include prior connection information (e.g., past connection to known bad hotspots). For example, if the client device has connected to a hotspot that is known to the gateway 105 as a bad hotspot, e.g., insecure hotspots, the zone assignment component 220 can leave the device assigned to the new device zone 155 or reassign the client device to the timeout zone 185. The gateway 105 can obtain information regarding the hotspots a client device has connected to from the client device. Also, the gateway 105 can include a list of hotspots that are considered to be bad. Either the network owner or a third party service provider who manages the gateway 105 can create and manage such a list in the gateway 105.

The additional information can also include conflicting information. For example, a client device reports that the client device is a printer, but the device identification component 215 has obtained alternative information suggesting that the device is not a printer. In such cases, the zone assignment component 220 can leave the client device assigned to the new device zone 155, reassign the client device to the timeout zone 185 and/or send a notification to the network owner.

In some embodiments, the additional information is received from a third party service provider and/or any other server that recommends device-zone pairings.

The additional information can also include temporal information. For example, a connection access request by a new IoT device at a specified time of the day, e.g., 3 am, can cause the zone assignment component 220 to assign the client device to the guest zone 180. In another example, if there is not sufficient information about a client device, the unknown client device can be assigned to an unknown device zone, e.g., complete isolation from other resources in the LAN 120 and limited access to the external network 110. Further, the unknown client device can be assigned to the unknown device zone for a temporary period, e.g., one day or one week or until sufficient usage data is gained for the zone assignment component 220 reassign the unknown client device, or for the network owner or the third party service provider to gather confidence that the unknown client device belongs in another zone or is otherwise safe to elevate to a different zone.

Referring back to determination block 410, if the device identification component 215 determines the third client device 118 as a known device, at block 425, the zone assignment component 220 assigns the third client device 118 to the device zone it was previously assigned, e.g., determined using the device identification information in the known-devices list.

Figure 5:
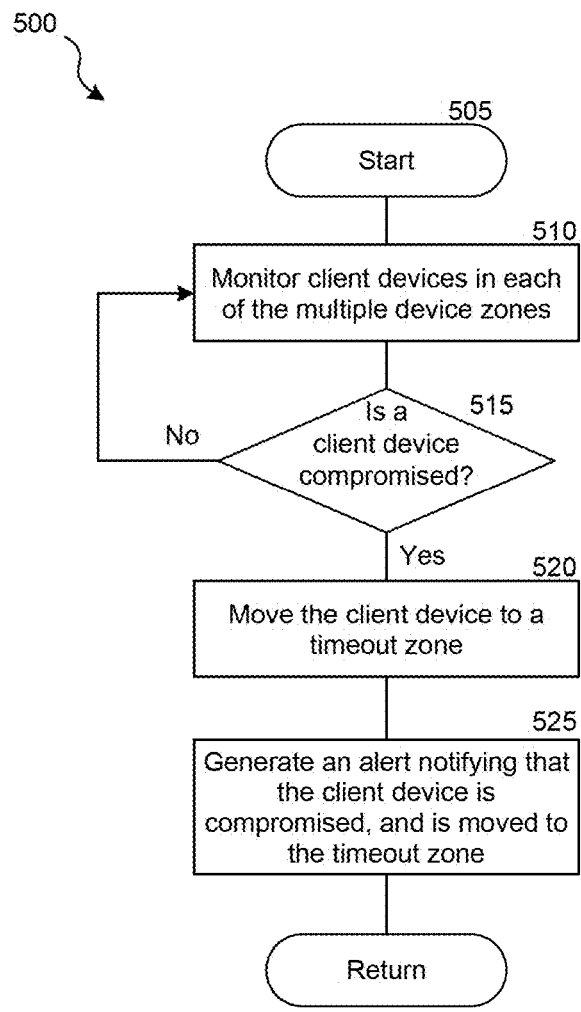
FIG. 5 is a flow diagram of a process for assigning a client device to a timeout zone of the gateway of FIG. 1, consistent with various embodiments.

FIG. 5 is a flow diagram of a process 500 for assigning a client device to a timeout zone of the gateway of FIG. 1, consistent with various embodiments. The process 500 can be implemented in the environment 100 of FIG. 1. The process 500 starts at block 505, and at block 510, the monitoring component 225 monitors a status of the client devices 115 in the LAN 120 of the gateway 105.

At determination block 515, the monitoring component 225 determines if a client device, e.g., the second client device 117, is compromised. In some embodiments, the second client device 117 is compromised in an event the second client device 117 is infected by malware, fails any other security check, and/or fails an integrity check. In an event the second client device 117 is not compromised, the monitoring component 225 continues to monitor the second client device 117 at block 510. On the other hand, if the monitoring component 225 determines that the second client device 117 is compromised, the monitoring component 225 notifies the zone assignment component 220 that the second client device 117 is compromised.

At block 520, the zone assignment component 220 moves the second client device 117 from its current device zone, e.g., the IoT zone 175, to the timeout zone 185, where the second client device 117 is isolated from other client devices in the LAN 120. That is, while in the timeout zone 185, the second client device 117 is restricted from accessing any other client device in the LAN 120. Further, the second client device 117 can also be provided limited access to the external network 110, e.g., limited bandwidth or access to limited websites. In some embodiments, the timeout zone 185 includes only those client devices that are compromised.

At block 525, the communication component 210 generates a notification indicating to the network owner that the second client device 117 is moved to the timeout zone 185. After the second client device 117 is moved to the timeout zone 185, a number of actions can be performed. For example, the management component 230 can attempt to secure the second client device 117, e.g., execute an anti-malware program to remove the malware. In another example, the notification can prompt the network owner to secure the second client device 117, e.g., remove the malware from the second client device 117. In still another example, the management component 230 can disconnect the second client device 117 if it is not secured within a specified period. The notification can be sent to the network owner as an email, a text to a user-preferred device, an in-app notification on the user-preferred device, or as a notification within the GUI of the gateway 105.

Figure 6:
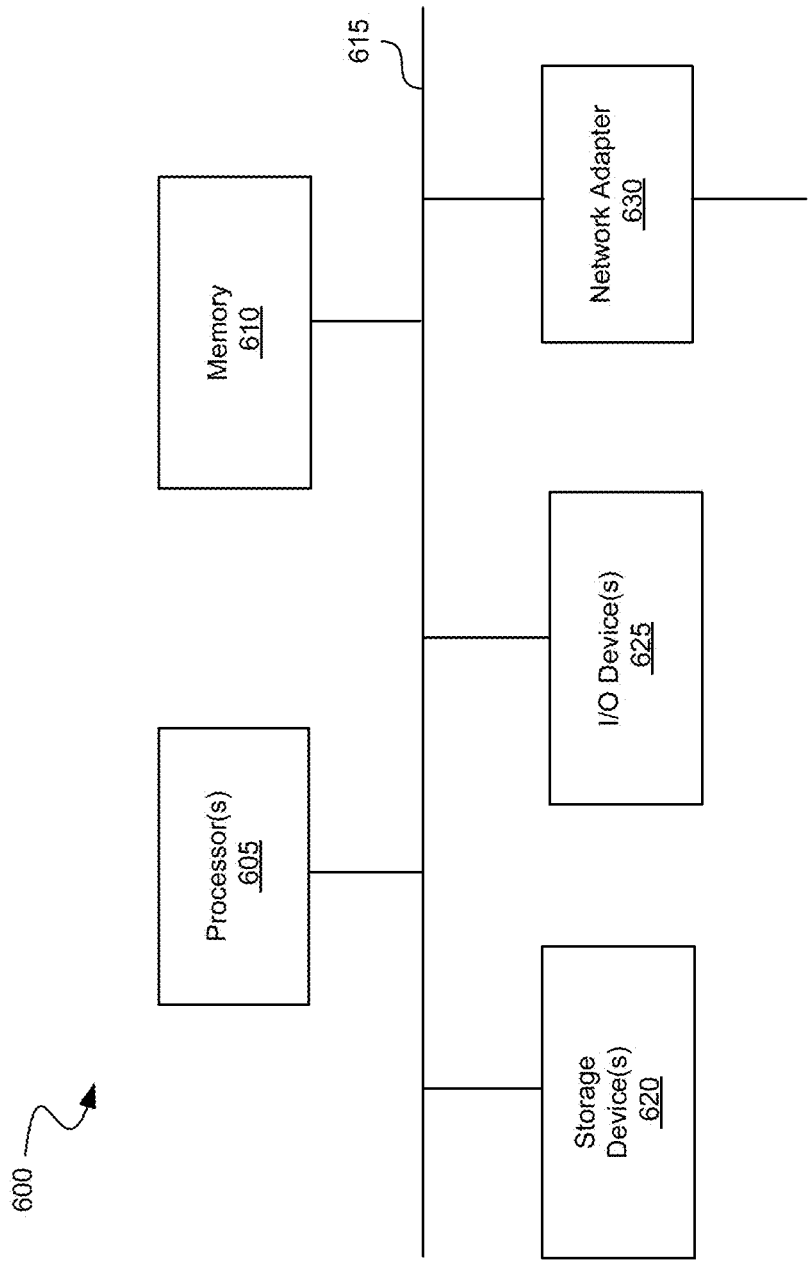
FIG. 6 is a block diagram of a processing system that can implement operations, consistent with various embodiments.

FIG. 6 is a block diagram of a computer system as may be used to implement features of the disclosed embodiments. The computing system 600 may be used to implement any of the entities, components, modules, systems, or services depicted in the examples of the foregoing figures (and any other entities described in this specification). The computing system 600 may include one or more central processing units ("processors") 605, memory 610, input/output devices 625 (e.g., keyboard and pointing devices, display devices), storage devices 620 (e.g., disk drives), and network adapters 630 (e.g., network interfaces) that are connected to an interconnect 615. The interconnect 615 is illustrated as an abstraction that represents any one or more separate physical buses, point to point connections, or both connected by appropriate bridges, adapters, or controllers. The interconnect 615, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 610 and storage devices 620 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non transitory" media).

The instructions stored in memory 610 can be implemented as software and/or firmware to program the processor(s) 605 to carry out actions described above. In some embodiments, such software or firmware may be initially provided to the processing system 600 by downloading it from a remote system through the computing system 600 (e.g., via network adapter 630).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a specified feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

What is claimed is:

1. A computer-implemented method performed at a network gateway device, comprising:
    generating multiple device zones in a local area network of the network gateway device, the network gateway device providing multiple computing devices access to an external network, wherein the computing devices in different device zones have different sets of network access privileges, wherein generating the device zones includes:
        generating an Internet of Things ("IoT") device zone in which an assigned computing device is isolated from other computing devices in the local area network but allowed to access content from the data storage system in the data storage zone;
    receiving a connection request from a first computing device for connecting to the network gateway device;
    extracting one or more parameters associated with the first computing device from the connection request;
    measuring a network bandwidth usage associated with the multiple device zones in the local area network; and
    assigning the first computing device to one of the device zones based on the one or more parameters and based on the network bandwidth usage.

2. The computer-implemented method of claim 1, wherein the one or more parameters include a software related parameter or a hardware related parameter of the first computing device.

3. The computer-implemented method of claim 1, wherein assigning the first computing device to the one of the multiple device zones includes:
    assigning the first computing device to a new device zone in an event the first computing device is not in a known-devices list, wherein the new device zone restricts the first computing device from accessing other resources in the local area network while providing limited access to the external network.

4. The computer-implemented method of claim 3 further comprising:
    determining a type of the first computing device based on the one or more parameters; and
    assigning the first computing device from the new device zone to one of the multiple device zones based on the type of the first computing device.

5. The computer-implemented method of claim 4, wherein assigning the first computing device to one of the device zones includes:
    generating, by the network gateway device, a notification recommending a specified zone to which the first computing device is to be assigned, and
    receiving an approval from a user associated with the network gateway device to assign the first computing device to the specified zone.

6. The computer-implemented method of claim 3, wherein providing the limited access to the external network includes limiting an available network bandwidth to the first computing device.

7. The computer-implemented method of claim 4, wherein assigning the first computing device to one of the device zones includes assigning the first computing device to a PC zone if the first computing device is of a personal computer type, wherein the PC zone allows the first computing device to access other computing devices in the PC zone, at least some other resources in the local area network, and the external network.

8. The computer-implemented method of claim 4, wherein assigning the first computing device to one of the device zones includes assigning the first computing device to a mobile device zone if the first computing device is of a mobile device type, wherein the mobile device zone allows the first computing device to access the external network while restricting the first computing device from accessing other resources in the local area network other than a portion of the data storage system.

9. The computer-implemented method of claim 1, wherein assigning the first computing device to the one of the multiple device zones includes:
    determining from the one or more parameters that the first computing device failed an integrity or a security check, and
    moving the first computing device to a timeout zone, wherein the timeout zone restricts the first computing device from accessing other resources in the local area network while permitting limited access to the external network.

10. The computer-implemented method of claim 9 further comprising:
    generating an alert to indicate a user associated with the network gateway device that the first computing device failed the integrity or security check.

11. The computer-implemented method of claim 9, wherein permitting the limited access to the external network includes at least one of limiting an available network bandwidth to the first computing device or restricting the first computing device from accessing one or more websites.

12. The computer-implemented method of claim 1, wherein assigning the first computing device to the one of the multiple device zones includes:
   determining from the one or more parameters that the first computing device is an IoT device, and
   assigning the first computing device to the IoT device zone, wherein the IoT device zone provides the first computing device access to the external network, restricts the first computing device from accessing any resources in the local area network other than computing devices within the IoT device zone, and provides a limited access to the data storage system.

13. The computer-implemented method of claim 12, wherein the IoT device zone provides the limited access to the data storage system by providing access to data that is accessible through internal access mode of the data storage system.

14. The computer-implemented method of claim 12, wherein the IoT device zone permits the external network to access the IoT device.

15. The computer-implemented method of claim 1, wherein assigning the first computing device to the one of the multiple device zones includes:
   assigning the first computing device to a printer zone in an event the one or more parameters indicate that the first computing device is a printer device, wherein the printer zone restricts the first computing device from accessing other resources in the local area network while permitting access to the external network.

16. The computer-implemented method of claim 1, wherein assigning the first computing device to the one of the multiple device zones includes:
   determining based on the one or more parameters that the first computing device is a trusted device; and
   assigning the first computing device to a first trusted zone, wherein the first trusted zone allows the first computing device to access other computing devices in the first trusted zone, at least some other resources in the local area network, and the external network.

17. The computer-implemented method of claim 16, wherein determining the first computing device is the trusted device includes:
   prompting a user associated with the network gateway device to confirm that the first computing device is the trusted device, and
   receiving an indication from the user that the first computing device is the trusted device.

18. The computer-implemented method of claim 16, wherein the at least some other resources in the local area network that can be accessed by the first computing device include computing devices in a printer zone and the data storage system in the storage zone.

19. The computer-implemented method of claim 1, wherein the local area network is a wireless network and at least a subset of the multiple device zones has the same SSID of the wireless network.

20. The computer-implemented method of claim 1, wherein the local area network is a wireless network and at least one of the multiple device zones has an SSID that is different from that of the rest of the multiple device zones.

21. The computer-implemented method of claim 1 further comprising:
   providing backup services for backing up data from at least some of the computing devices in the local area network to the data storage system.

22. The computer-implemented method of claim 21, wherein providing backup services includes backing up at least a portion of the data from the data storage system and/or the at least some of the computing devices to a data storage server in the external network.

23. The computer-implemented method of claim 1 further comprising:
   providing security services for detecting and mitigating malware in at least some of the computing devices in the local area network.

24. A non-transitory computer-readable storage medium storing computer-readable instructions, comprising:
   instructions for generating multiple device zones in a local area network of a network gateway device, the network gateway device providing multiple computing devices connected to the network gateway device access to an external network, wherein the computing devices in different device zones have different sets of network access privileges, wherein generating the device zones include:
      generating a data storage zone to which a data storage system in the local area network is assigned, and
      generating an Internet of Things ("IoT") device zone in which an assigned computing device is isolated from other computing devices in the local area network but allowed to access content from the data storage system in the data storage zone;
   instructions for receiving a connection request from a first computing device for connecting to the network gateway device;
   instructions for extracting one or more parameters associated with the first computing device from the connection request;
   instructions for measuring a network bandwidth usage associated with the multiple device zones in the local area network; and
   instructions for assigning the first computing device to one of the device zones based on the one or more parameters and based on the network bandwidth usage.

25. The non-transitory computer-readable storage medium of claim 24, wherein the instructions for assigning include:
   instructions for determining from the one or more parameters that the first computing device is an IoT device, and
   instructions for assigning the first computing device to the IoT device zone, wherein the IoT device zone provides the first computing device access to the external network and a limited access to the data storage system in the data storage zone, and wherein the IoT device zone restricts the first computing device from accessing any resources in the local area network other than computing devices within the IoT device zone.

26. The non-transitory computer-readable storage medium of claim 25, wherein the data storage system stores content that can be accessed by the first computing device for streaming onto a presentation device.

27. The non-transitory computer-readable storage medium of claim 24, wherein the instructions for assigning include:
   instructions for determining from the one or more parameters that the first computing device failed an integrity or a security check, and
   instructions for moving the first computing device to a timeout zone, wherein the timeout zone restricts the first computing device from accessing other resources in the local area network while permitting limited access to the external network.

28. The non-transitory computer-readable storage medium of claim 27, wherein the instructions for permitting the limited access to the external network include instructions for at least one of limiting an available network bandwidth to the first computing device or restricting the first computing device from accessing one or more websites.

29. The non-transitory computer-readable storage medium of claim 27 further comprising:

instructions for generating an alert to indicate a user associated with the network gateway device that the first computing device failed the integrity or security check.

30. The non-transitory computer-readable storage medium of claim 24 further comprising:

instructions for receiving device configuration information that assigns the first computing device to one of the multiple device zones, wherein the device configuration information is received from a first user associated with the network gateway device via a client device within the local area network.

31. The non-transitory computer-readable storage medium of claim 24 further comprising:

instructions for receiving device configuration information that assigns the first computing device to one of the multiple device zones, wherein the device configuration information is received from a first user associated with the network gateway device via a client device outside of the local area network.

32. A system, comprising:

a first component configured to generate multiple device zones in a local area network of a network gateway device, the network gateway device providing multiple computing devices connected to the network gateway device access to an external network, wherein the computing devices in different device zones have different sets of network access privileges, wherein the first component is configured to generate the device zones by:

generating an Internet of Things ("IoT") device zone in which an assigned computing device is isolated from other computing devices in the local area network but allowed to access content from the data storage system in the data storage zone;

a second component configured to receive a connection request from a first computing device for connecting to the network gateway device;

a third component configured to extract one or more parameters associated with the first computing device from the connection request;

a fourth component configured to measure a network bandwidth usage associated with the multiple device zones in the local area network; and a fifth component configured to assign the first computing device to one of the device zones based on the one or more parameters and based on the network bandwidth usage.

33. The system of claim 32, wherein the network gateway device is a set-top box.

* * * * *